United States Patent
Gopalanarayanan et al.

(10) Patent No.: US 7,166,358 B2
(45) Date of Patent: *Jan. 23, 2007

(54) POLYURETHANE ROLLS WITH GRAFT POLYACRYLATE CURATIVES

(75) Inventors: Bhaskar Gopalanarayanan, Lexington, KY (US); Kelly A. Killeen, Lexington, KY (US); Johnny D. Massie, II, Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 262 days.

This patent is subject to a terminal disclaimer.

(21) Appl. No.: 10/756,220

(22) Filed: Jan. 13, 2004

(65) Prior Publication Data

US 2005/0154102 A1 Jul. 14, 2005

(51) Int. Cl.
*C08G 18/63* (2006.01)

(52) U.S. Cl. .................. 428/423.1; 428/425.8

(58) Field of Classification Search ............ 428/423.1, 428/425.8
See application file for complete search history.

(56) References Cited

U.S. PATENT DOCUMENTS

| | | | |
|---|---|---|---|
| 3,823,201 A | 7/1974 | Pizzini et al. | |
| 4,111,861 A | 9/1978 | Godlewski | ......... 521/123 |
| 4,210,727 A | 7/1980 | Preston et al. | |
| 4,258,148 A | 3/1981 | Chandalia et al. | |
| 4,359,542 A | 11/1982 | Chandalia et al. | |
| 4,359,571 A | 11/1982 | Bernstein et al. | |
| 4,504,313 A | 3/1985 | Robertson | ......... 106/38.2 |
| 4,521,546 A | 6/1985 | O'Connor et al. | |
| 5,021,506 A | 6/1991 | Gastinger et al. | |
| 5,070,141 A | 12/1991 | Gastinger et al. | |
| 5,223,570 A | 6/1993 | Huang et al. | |
| 5,250,581 A | 10/1993 | Gastinger et al. | |
| 5,262,486 A | 11/1993 | Telser et al. | |
| 5,733,973 A | 3/1998 | Wamprecht et al. | |
| 5,810,705 A | 9/1998 | Mimura et al. | |
| 5,843,577 A | 12/1998 | Ouhadi et al. | |
| 5,874,172 A * | 2/1999 | Beach et al. | ......... 428/423.1 |
| 5,925,893 A | 7/1999 | Ishii et al. | |
| 6,011,090 A | 1/2000 | Sakogawa et al. | |
| 6,035,172 A | 3/2000 | Mimura et al. | |
| 6,142,922 A * | 11/2000 | Yoshikawa et al. | ......... 492/56 |
| 6,265,457 B1 | 7/2001 | Dolgopolsky et al. | |
| 6,414,081 B1 | 7/2002 | Ouhadi | |
| 6,489,382 B1 | 12/2002 | Giesecke et al. | |
| 6,515,077 B1 | 2/2003 | Su et al. | |

OTHER PUBLICATIONS

Oretel, Handbook of Polyurethanes, 1985, pp. 430-432.
Nair, Polyurethanes with Polybutyl Acrylate Grafts Via Macromonomer Technique: Thermal and Mechanical Properties, *Eur. Polym J.*, vol. 33, No. 1, 1997, pp. 89-95.

* cited by examiner

*Primary Examiner*—Rachel Gorr
(74) *Attorney, Agent, or Firm*—Dinsmore & Shohl

(57) ABSTRACT

The invention is directed to rolls comprising a polyurethane elastomer formed from a polyurethane mixture comprising, inter alia, at least one graft polyacrylate curative, and processes for manufacturing such rolls. The roll is suitable for employment in image forming devices, for example in electrophotographic print applications.

28 Claims, No Drawings

POLYURETHANE ROLLS WITH GRAFT POLYACRYLATE CURATIVES

FIELD OF THE INVENTION

The present invention relates to polyurethane rolls and to the processes for manufacturing them. In particular, the invention relates to polyurethane rolls formed from, inter alia, graft polyacrylate curatives. Graft polyacrylate curatives are prepared via free radical polymerization of selected acrylate monomers. The inventive rolls are suitable for use for example, as developer rolls in image forming devices such as electrophotographic print applications, and exhibit physical property parameters suitable for reduced-geometry print applications.

BACKGROUND OF THE INVENTION

Wide availability, relative inexpense, and functional versatility, have led to the adaptation and use of polyurethane elastomers with specific physical properties in a diverse array of technical applications. One such application is as conductive and semi-conductive members in image forming devices such as electrophotographic printers. As printer art evolves according to the motivation of increased office space efficiency in light of ergonomic considerations, it is desirable to develop more compact image forming devices having a smaller device footprint. As a consequence, there is a need for reduced-geometry elastomeric printer components. However, it has been discovered that necessary size adaptations alter the functioning of the elastomeric components with respect to, for example, required compressive forces, nip widths, triboelectric charging capacity, and rotational torque. Utilization of reduced-geometry components having the same elastomeric properties as conventional larger sized components can result in the occurrence of unacceptable print variations and distortions in the final printed product. Hence, the composition of the elastomers forming the rolls needs to be adapted to confer physical properties which would compensate for the reduced geometry and restore the quality of the final printed product.

In electrophotographic printer applications, the developer roll functions to develop a layer of toner onto a charged photoconducting drum. The toner is metered onto the surface of the developer roll via a doctor blade. The electrical properties of the developer roll assist in the electrostatic transfer of the charged toner from the roller surface to the photoconductor drum. The compositions and properties of conventional developer rolls are disclosed in detail in U.S. Pat. No. 5,707,743 to Janes et al., No. 5,804,114 to Janes et al., No. 5,874,172 to Beach et al., and No. 6,117,557 to Massie II, et al., all of which are incorporated herein by reference. These patents relate to rolls with high surface resistance, processes of manufacturing high surface resistance rolls involving the oxidation of a diene diol such as polybutadiene in the presence of a conductive modifier such as ferric chloride, antioxidant requirements, and the desirability of caprolactone ester polyurethane developer rolls, respectively. These patents also disclose the print performance advantages and electrical properties of two-layered developer rolls and techniques for production of semiconductive rolls in general, and the particular techniques for the production of the resistive surface layer characteristics.

Typically, plasticizers are used to reduce the hardness of polymeric elastomers such as cast polyurethanes. However, plasticizing additives are not chemically bound into the polymer matrix and are therefore free to migrate throughout, including to the surface of a roll formed therefrom. This may cause problems in electrophotographic print applications. At the surface of the developer roll, these migrating additives interact with the toner particles, causing them to coalesce in the nip area of the developer roll and photoconducting drum.

It is known in the polyurethane art that addition of polyols to the polyurethane mixture may lower the hardness of the final polyurethane elastomer. However, these polyols typically result in not only a decrease in hardness, but also in concomitant undesirable changes in other physical properties of the elastomer, such as increased compression set.

Hence, it is desirable to provide soft elastomeric rolls wherein sufficiently low compression set is maintained. It is further desirable that the hardness is decreased via means that do not involve additives with the potential to migrate, and which do not cause unacceptable increases in roll compression set. In addition, it is advantageous to provide a more compliant roll which eliminates the non-uniformities in print performance caused by geometry reduction of the roll and consequential increases in force at the nips between the developer roll and doctor blade and between the developer roll and photoconducting drum.

SUMMARY OF THE INVENTION

Accordingly, it is an object of the present invention to provide rolls suitable for use in, for example, electrophotographic image-forming devices having either conventional or reduced-geometry dimensions. It is a further object to provide rolls which overcome disadvantages of the prior art.

One embodiment of the invention is directed to a roll comprising an inner conductive layer and an outer semiconductive layer disposed about the inner layer. The outer layer comprises a polyurethane elastomer, wherein the elastomer is formed from a polyurethane mixture comprising at least one graft polyacrylate curative.

In another embodiment of the invention, the outer layer comprises a polyurethane elastomer which is formed from a polyurethane mixture comprising urethane prepolymer, polydiene diol or polydiene prepolymer with toluene diisocyanate, trifunctional polyol curative, at least one graft polymer curative, conductive modifier, hydrolytic stabilizer, and, optionally, linear polymer curative. The roll has an oxidized outer surface.

Still another embodiment of the invention is directed to a process for manufacturing an elastomeric roll. The process comprises including at least one graft polyacrylate curative in a polyurethane mixture and subjecting the polyurethane mixture to conditions sufficient to effect curing.

A more specific embodiment of the invention is directed to a process of manufacturing a roll. The process comprises forming a polyurethane mixture comprising urethane prepolymer, polydiene diol or prepolymer of polydiene diol with toluene diisocyanate, trifunctional polyol curative, at least one graft polyacrylate curative, conductive modifier, hydrolytic stabilizer, and, optionally, linear polymer curative. The process further comprises casting the polyurethane mixture into a mold, subjecting the mixture to curing conditions sufficient to demold a resultant roll, demolding the roll and optionally post-curing the roll, grinding the roll to desired dimensions, and baking the roll under conditions sufficient to oxidize the outer surface of the roll.

The rolls and processes of the invention advantageously employ components which may be easily formulated and incorporated into the inventive rolls by methods well-known in the arts. The rolls exhibit compliance and compression set suitable for reduced geometry electrophotographic printers such that print quality is maintained. In addition, the inventive rolls and processes may be used in any application wherein nip force must be reduced without adversely affecting the final printed product. These, and additional objects, embodiments and advantages are disclosed in further detail in the following detailed description.

DETAILED DESCRIPTION

The present inventive rolls and processes for manufacturing the rolls comprise graft polyacrylate curative bound into the polyurethane elastomeric matrix, for example via the addition of graft polyacrylate curatives to the polyurethane mixture. In one embodiment, polyacrylate side chains of graft polyacrylate curative are grafted onto the polyurethane network during cure to afford softer elastomers which maintain the low compression set measurements desirable for particular applications.

For purposes of depicting the invention, compliance of the polyurethane elastomer is described by hardness, measured according to ASTM D2240-86 in Shore A. Compression set, as used herein, is 25% compression set and is measured according to ASTM D395-89 using method B and exposed to 70° for 22 hours. A compressive force is applied to the elastomer causing it to compress 25% of its original height. The compression force is released after a standardized time under standardized conditions, and the elastomer is given a chance to restore or recover its original height. A compression set of 100% is equivalent to zero restoration, while a compression set of 0% is equivalent to 100% recovery. Similarly, a compression set of 5% indicates a 95% recovery. Note that this would be 95% of 25% compression, equivalent to the elastomer restoring to 98.75% of its original height. Generally, compression set reflects the degree to which an elastomer fails to recover from a standard percent compression, once the given compression force is released, and represents a permanent deformation.

It was discovered that reducing the geometry of the developer roll utilized in electrophotographic print devices resulted in unacceptable print performance. Developer roll compliance (softness) is an important factor in achieving acceptable print performance. The developer roll and the photoconducting drum must maintain nip contact pressure within specific limits. If the contact pressure is too low, there is a resultant loss of image on the final printed page, resulting in a phenomena known in the industry as "white gapping." If the contact pressure is too high, poor print quality results, manifest as an increase in "graininess."

There are many potential sources of nip force variability, for example: spring force variation, radial lags in developer drive coupling, toner supply roll friction, axial locator friction, and developer weight change as toner supply decreases. These variables are familiar to one skilled in the printer arts. Nip pressure control via the composition of the roll is even more important in particular designs, such as two piece cartridge designs, wherein assembly line screening of component set-up is precluded because such factors are under the control of the consumer. Several roll parameters can be manipulated to alter the nip force. For example, it was found that a larger nip width (the footprint at a contact point) reduces graininess. Also, a smaller nip force, all other factors being held constant, yields less graininess in the final printed product. The peak contact pressure, which results from a combination of the nip force and nip width, is impacted by the compliance, and therefore composition, of the developer roll.

In decreasing the geometry of the printer and printer components, the pressure at the nip increased and the aforementioned unacceptable print variation problems were observed. The need arose for a softer, more compliant developer roll in order to keep the nip pressure within acceptable limits. Hence, it is desirable to have a developer roll that is softer such that it is less susceptible to manifesting printing performance variations and non-uniformities due to unacceptable nip pressures at the developer roll-doctor blade and developer roll-photoconducting drum interfaces.

In one embodiment of the invention, a polyurethane roll, formed according to one embodiment of the inventive process, is suitable as a developing roll for electrophotographic printing applications where a desired combination of hardness and compression set allows more uniform toner distribution during the functional life of the printer. This embodiment is particularly advantageous in reduced-geometry printers requiring reduced diameter rolls because it allows for decreasing the forces at the developing roll interfaces with other components.

More specifically, the invention relates to rolls comprising cast polyurethane elastomer and processes for manufacturing them. In one process embodiment, the inventive rolls are prepared from a polyurethane mixture comprising urethane prepolymer, polydiene in either diol or prepolymer form, trifunctional polyol curative for cross-linking the polymer, at least one graft polyacrylate curative, conductivity modifier, hydrolytic stabilizer, and, optionally, block polymer curative. The polyurethane mixture is cast into a mold. In a more specific embodiment, the mold has a central core consisting of a metal shaft and casting the polyurethane mixture into the shafted mold forms a shafted roll. Alternatively, the roll can be shafted subsequent to casting. The metal shaft may or may not be coated with a conductive adhesive. The molded roll is cured at high enough temperatures and under conditions sufficient to allow demolding. Those skilled in the art can readily determine what constitutes such sufficiency. Once demolded, the roll may be further processed, for example, via additional curing, grinding to the required functional dimensions, and then baking at an elevated temperature (>80° C.) for a time sufficient to oxidize the surface of the roll. This controlled oxidation produces a high resistivity layer of material on the surface of the roll.

The polyurethane mixture is substantially uncured and comprises ingredients which form the final elastomeric product upon curing. While the present description details various specific ingredients, the scope of the invention is contemplated to include any polyurethane mixture comprising graft polyacrylate curative, the addition of other ingredients into the polyurethane mixture notwithstanding. Suitable components in addition to the graft polyacrylate curative are disclosed in U.S. Pat. No. 5,707,743 to Janes et al., No. 5,804,114 to Janes et al., No. 5,874,172 to Beach et al., and No. 6,117,557 to Massie II, et al., all of which are incorporated herein by reference.

Various urethane materials may be used to form the backbone and networking matrix of the inventive rolls. For ease of manufacturing, urethane prepolymer(s) may be used. Polycaprolactone urethane prepolymer is a suitable base urethane because of its stable electrical resistivity with temperature and humidity changes. In a specific embodiment, a polycaprolactone ester toluene-diisocyanate prepolymer is utilized. As explained in detail in referenced U.S. Pat. No. 6,117,557, urethanes having caprolactone-based polyester moieties have desirably low environmental sensitivity.

To provide a roll with a resistive layer on the surface, a polydienediol, such as polybutadiene, or a polydiene prepolymer is included in the formulation. For example, polybutadiene prepolymers may be prepared by the reaction of a polybutadiene diol with toluene diisocyanate. This prepolymer can be blended with the urethane prepolymer in various proportions. Typical urethane prepolymer/diene blend ratios range from 95/5 parts by weight to 60/40 parts by weight. The resistive layer is produced by baking the ground roll in air at an elevated temperature for some length of time. This air-baking procedure oxidizes the conductive modifier and polydiene diol or polydiene prepolymer, for example, polybutadiene. This process is described in detail in U.S. Pat. No. 5,804,114 to Janes et al. and is incorporated herein by reference. Polybutadiene is highly unsaturated which makes it very susceptible to oxidation. The conductive modifier catalyzes this oxidation. The thickness and electrical resistivity of the surface layer can be controlled by varying the concentration of conductive modifier, polybutadiene, the baking temperature, the level of oxygen, and baking time. The resistive surface layer produced by this oxidation process is permanent.

In another specific embodiment of the invention, the polydiene diol comprises polybutadiene diol. The polybutadiene diol is a highly resistive material. Addition of 0.1 part by weight of a conductive modifier such as ferric chloride powder to one hundred parts by weight polycaprolactone urethane reduces the electrical resistivity from the $5 \times 10^{10}$ ohm-cm range to approximately $1.5 \times 10^{8}$ ohm-cm.

In one embodiment, the conductive modifier comprises a conductive metal salt selected from the group consisting of ferric chloride, ferrous chloride, calcium chloride and cobalt hexafluoroacetylacetonate, for example in powder form. In a more specific embodiment, the conductive modifier comprises ferric chloride. The conductive modifier is added to the polyurethane mixture to reduce the bulk resistivity for example to less than about $1 \times 10^9$ ohm-cm. Typical concentrations of conductive modifier range from 0.05 to 0.30 part by weight per hundred elastomer, more specifically 0.1 to 0.25 parts by weight per hundred parts elastomer.

In a specific embodiment, the polyurethane mixture is cast into a mold around a central, metal shaft and then subjected to conditions sufficient to effect curing. Typically, this occurs when subjected, under standard pressure, to temperatures of approximately 100° C. for 16 hours using a combination of curing in the mold, demolding, and postcuring in an oven to produce the polyurethane elastomeric roll. One skilled in the art will appreciate that other suitable curing conditions may be employed. The roll may then be then ground to the desired dimensions, and oxidized as discussed above to provide the surface layer of high resistivity.

It is not uncommon for an office environment to have conditions such that a printer, particularly a developer roll inside a printer, is exposed to both high humidity and a high operating temperature (>40° C.). Many polyurethanes can degrade when exposed to a high level of moisture such as 80% relative humidity for a prolonged period of time and high temperature can accelerate the degradation of polyurethane elastomers. Also, an acid source such as ferric chloride may accelerate degradation of the urethane. Degradation is characterized herein as a loss in durometer hardness when exposed to a high temperature and high humidity environment such as 60° C. and 80% relative humidity for a specified period of time. The use of a hydrolytic stabilizer in the polyurethane elastomer maintains the resulting roll's physical and electrical properties over a long period of time and at various environmental conditions. In one embodiment of the inventive roll, a hydrolytic stabilizer is added to the polyurethane mixture and acts to stabilize and inhibit degradation of the resultant roll. Specific embodiments of the inventive roll and methods comprises triisopropanolamine (TIPA) as the hydrolytic stabilizer. Desirably, addition of low concentrations of TIPA do not influence electrical properties of the roll. Other hydrolytic stabilizers are known in the art and may be suitable for use herein.

In addition, the polyurethane mixture may optionally include antioxidant(s), to provide long-term oxidative aging stability. For example, a substituted phenol such as 2,6-di-tert-butyl-p-cresol (BHT), or other suitable antioxidant material is added to the polyurethane mixture to control oxidative aging. Typical amounts will vary. However, amounts in the range of from about 2000 to about 5000 parts per million have been shown to be effective for this purpose. Specific embodiments of the inventive roll and methods may comprise 2,6-di-tert-butyl-p-cresol as an antioxidant, but the scope of the invention should be construed to include any effective antioxidant, numerous examples of which are known in the art.

In one embodiment, typical roll elastomers exhibit a hardness ranging from about 40 to about 60 Shore A (measured by ASTM D2240), without the use of a plasticizer, which may be detrimental to the photoconductor drum material. The inventive rolls typically exhibit a Shore A hardness of less than about 48, while maintaining a compression set of less than about 8% (measured by ASTM D395, Method B, 22 hr @70° C.) to assist in providing uniform printing performance. In more specific embodiments, the roll exhibits a compression set of less than about 5%.

The polyurethane mixture is cured with polyol curatives. The polycaprolactone urethane prepolymer can be cured by using a combination of the diene diol and a trifunctional curative. A trifunctional curative, as used herein, comprises three functional groups, a functional group being defined as a group comprising at least one reactive hydrogen, for example, —OH or $NH_2$. The trifunctional curative, then, is capable of functioning not only as a polymer chain extender, but as a cross-linker as well. A trifunctional curative is suitable to the extent any cross-linking and/or networking of the final polyurethane matrix is desired.

At least one graft polyacrylate curative is also included in the polyurethane mixture. In one embodiment of the present invention, the graft polyacrylate curative has a number average molecular weight (hereinafter, $M_n$) of greater than about 1000. The graft polyacrylate curatives are graft polymers and in a specific embodiment comprise at least one polyacrylate side chain grafted to a relatively low molecular weight main chain, defined as having an $M_n$ of less than about 200. In a further embodiment, the main chain of the graft polyacrylate curative comprises diol functionality, which is defined as having two hydroxyl groups. Other embodiments of the invention comprise graft polyacrylate curatives comprising additional functional groups on the side chain as well.

In one embodiment, the graft polyacrylate curative is reacted into the polyurethane network. More particularly, the high molecular weight polyacrylate curative, defined as having an $M_n$ of greater than or equal to about 1000, has a low molecular weight main chain—defined as having an $M_n$ of less than about 200. The low molecular weight main chain preferably has diol functionality and the hydroxy-functional portions of the polymer act as a short chain extender for the polyurethane backbone, leaving the bulk of the high molecular weight polyacrylate hanging pendant to the backbone.

The polyacrylate portion of the polymer can be made from one or more commercially available acrylic and/or methacrylic monomers.

The graft polyacrylate curatives are formed from at least one acrylate monomeric species in addition to any other monomeric species selected for the particular properties it/they may confer. Acrylate monomers are available in wide structural and functional variety. A description of one method of manufacturing such graft polyacrylates involving free radical polymerization of the constituent monomers, is found in the co-pending application filed herewith, published as US 20051/54,174, incorporated herein by reference. Generally, the diol functionality of the graft polyacrylates is incorporated onto the main chain by use of a functional initiator or chain transfer agent such as, for example, 3-mercapto-1,2-propanediol, during the polymerization of the acrylic monomers. This takes place in a free-radical polymerization that occurs in a separate step prior to formulation of the final polyurethane.

The polyurethane mixture comprises at least one graft polyacrylate curative, preferably with diol functionality on the main chain, and, optionally, may comprise one or more conventional linear curatives with at least diol functionality. In one embodiment, the graft curatives are selected so that the final elastomeric roll exhibits sufficiently reduced hardness, yet maintains suitable compression set when compared to developer rolls comprised of typical linear curatives.

In one embodiment of the inventive roll and method, the polyurethane mixture comprises from about 1% to about 50% by weight of graft polyacrylate curative. In a more specific embodiment of the inventive roll and method, the polyurethane mixture comprises from about 5% to about 35% by weight of the graft polyacrylate curative. In an even more specific embodiment, the polyurethane mixture comprises from about 8% to about 20% by weight of the graft polyacrylate curative.

EXAMPLES

Examples 1–4 below are intended to illustrate diol-terminated graft polyacrylate curatives suitable for use in this invention. The graft polyacrylate curatives are prepared via free radical polymerization of selected acrylate monomers. The scope of the invention, however, should not be limited by the selection of these monomeric species, combinations or structures. Examples 5–8 illustrate polyurethane mixture formulations within the scope of the invention. The rolls derived therefrom illustrate that the addition of graft polyacrylate curatives to polyurethane mixtures yields elastomers with reduced hardness, suitable compression set (<8%), and sufficient physical parameters related to the requisite electrical properties of the developer roll embodiment of the present inventive roll. Examples 5–8 are within the scope of the invention, and employ graft polyacrylate curative examples 1–4. Example 9 is the identical polyurethane mixture formulation without a graft polyacrylate curative, and is provided for comparative purposes. Ingredients listed below in Table 1 are identified by the brand-named product specifically employed. However, the scope of the invention should not be considered limited in any way by inclusion of this information, and other sources may be employed. In addition, the precise composition of the brand-named product is taken to be the formulation marketed under that name as of the filing date of this application.

TABLE 1

| Ingredient | Specific Source |
|---|---|
| Polycaprolactone ester toluene-diisocyanate prepolymer | Vibrathane ® 6060, Uniroyal Chemical Company |
| Polybutadiene with BHT (contains up to 3% BHT) | Poly bd ® R-45HTLO-BHT, Elf Atochem |
| Polyol | Polyol TP30 ® Perstorp Polyols Inc. |
| Triisopropanolamine | Dow Chemical Company |
| Ferric Chloride | Sigma-Aldrich Company |

Examples 1–4

Graft Polyacrylate Curative Example 1 n-Butylacrylate

A solution of n-butylacrylate (600 g; 4682 mmol), 3-mercapto-1,2-propanediol (MPD) (18.22 g; 168.6 mmol), and dimethyl-2,2'-azobis-isobutyrate (1.08 g; 4.68 mmol) in 2400 ml ethylacetate is prepared, degassed, and then heated for 18 hours at 70–75° C., under nitrogen. The solvent is removed by oven drying at 80° C. yielding the graft polymer as a colorless, highly viscous liquid.

Graft Polyacrylate Curative Example 2

2-Ethylhexylacrylate

A solution of 2-ethylhexylacrylate (500 g; 2713 mmol), MPD (26.4g; 244.2 mmol), and dimethyl-2,2'-azobis-isobutyrate (0.625 g; 2.71 mmol) in 1500 ml ethylacetate is prepared, degassed, and then heated for 18 hours at 70–75° C., under nitrogen. The solvent is removed by oven drying at 80° C. yielding the graft polymer as a colorless, highly viscous liquid.

Graft Polyacrylate Curative Example 3

3-(Tris(trimethylsiloxy)silyl)propyl methacrylate and/or poly(propylene glycol)methyl ether acrylate.

A solution of 3-(tris(trimethylsiloxy)silyl)propyl methacrylate (100 g; 236.5 mmol), poly(propylene glycol)methyl ether acrylate (348.5 g; 1340 mmol), MPD (26.4 g; 244 mmol), and dimethyl-2,2'-azobis-isobutyrate (0.625 g; 2.71 mmol) in 800 ml ethylacetate is prepared, degassed, and then heated for 18 hours at 70–75° C., under nitrogen. The solvent is removed by oven drying at 80° C. yielding the graft polymer as a pale yellow liquid.

Graft Polyacrylate Curative Example 4

2-Hydroxyethylmethacrylate

A solution of 2-ethylhexylacrylate(500 g; 2713 mmol), 2-hydroxyethylmethacrylate (26.58 g; 204.2 mmol), MPD (23.67 g; 218.8 mmol), and dimethyl-2,2'-azobis-isobutyrate (0.67 g; 2.92 mmol) in 1500 ml ethylacetate is prepared, degassed, and then heated for 18 hours at 70–75° C., under nitrogen. The solvent is removed by oven drying at 80° C. yielding the graft polymer as a colorless, highly viscous liquid.

The ingredients as set forth below in Examples 5–9 are mixed to form polyurethane elastomers. Polyurethanes are prepared using a 0.95 stoichiometric ratio of —OH to —NCO, except where noted. The urethane prepolymer and diol curatives are independently warmed to 75° C. and degassed in a vacuum oven prior to mixing. Trifunctional curatives, Polyol TP30® and triisopropanol amine, are added to the formulation at ambient temperature immediately prior to molding. Ferric chloride is added as a solution in Polyol TP30®. The mixture is cast into a mold about a metal shaft, optionally coated with a conductive primer, then cured at 104° C. for about 16 hours total time, using a combination of curing in the mold, demolding, and post-curing, to produce a polyurethane elastomeric roll. The roll is ground to intermediate dimensions immediately after demolding, or upon post-curing. After any post-cure, the roll is ground to the precise functional dimensions. A resistive layer is produced on the ground roll via an oxidative baking process in which the rolls are baked in air at an elevated temperature for some length of time. Conditions for the oxidative bake process are formulation dependent and are listed with each example, 5–9.

Button samples of each urethane formulation are prepared concurrently by casting the formulation into button molds followed by subsequent curing, demolding, post-curing and oxidative baking. Hardness and compression set are reported for button samples of the inventive elastomers because they most closely reflect the properties of the elastomer itself, unlike roll hardness, which is dependent on factors such as roll geometry and shaft properties, in addition to properties of the elastomer. Using a Shore A durometer, button hardness is measured using ASTM Method D2240-86. A typical roll is 2–5 Shore A units harder than the corresponding button sample. The compression set is measured according to ADSTM D395-89, method B. Under this test method, the buttons are subjected to 25% compression (height) at 70° C. for 22 hours and the resultant permanent set is measured at room temperature. The amount of unreacted or leachable components present in each formulation is evaluated using a Soxhlet extraction technique in chloroform ($CHCl_3$). The cured urethane is cut into small pieces, approximately 8–27 $mm^3$, and placed in a Soxhlet tube. The Soxhlet tube is then suspended inside a flask fitted with a reflux condenser, over boiling chloroform for 24 hours. The chloroform is subsequently dried, and the mass of the remaining non-volatile extractable material is measured and compared to the original sample mass to determine the percent extracted. Hardness, compression set, and percent chloroform extractables are listed in Table 2 for all Examples 5–9.

The inventive rolls are characterized by a variety of electrical techniques. Generally, a conductive media such as conductive carbon paint or tape is applied in a strip down the surface of the roll. Attaching electrical contacts to the conductive carbon tape and the roll shaft completes a circuit. The direct current resistivity of the roll at 100 volts, the time constant, and the alternating current resistivity of the roll at 1 kHz are measured. The time constant is measured by applying a 100 volt bias to the roll, removing the voltage, then measuring the time for the voltage on the roll to decay to 1/e (~37%) of its original value. This time constant is related to the resistivity and thickness of the surface layer on the roll. The roll is modeled as two parallel RC circuits in series. One RC circuit represents the core and the second represents the resistive surface layer. The Janes et al. patent referenced above discusses in detail the theory behind these relationships and the applicable equations that result. Surface layer resistivity ($Rho_c$), surface layer thickness ($T_c$), and bulk resistivity ($Rho_b$) for rolls of Examples 5–9 were measured at 72° C. and 50% relative humidity and the results are reported in Table 2. Desirable electrical property ranges for the inventive rolls include: $Rho_c$ of from about $5\times10^9$ -about $2\times10^{12}$ Ohm-cm ($\Omega$), preferably between $1\times10^{11}$–$5\times10^{11}$ $\Omega$; $T_c$ of from about 50 to about 200 microns; and $Rho_b$ less than about $1\times10^9$ $\Omega$, preferably less than $3\times10^8$ $\Omega$.

Formulations:

Example 5

| Ingredient | Percent by Weight of PU mixture |
| --- | --- |
| Polycaprolactone ester toluene-diisocyanate prepolymer | 70.07 |
| Polybutadiene diol + BHT | 12.33 |
| Trifunctional curative (Polyol TP30 ® ) | 2.72 |
| Graft polyacrylate Example 1 | 14.63 |
| Ferric chloride | .15 |
| Triisopropanolamine | .10 |
| Total | 100.00 |

Oxidative bake process: 10 hours at 120° C.

Example 6

| Ingredient | Percent by Weight of PU mixture |
| --- | --- |
| Polycaprolactone ester toluene-diisocyanate prepolymer | 69.99 |
| polybutadiene diol | 12.33 |
| Trifunctional curative(Polyol TP30 ® ) | 2.58 |
| Graft polyacrylate Example 2 | 14.84 |
| Ferric chloride | .15 |
| Triisopropanolamine | .10 |
| Total | 100.00 |

Oxidative bake process: 14 hours at 120° C.

Example 7

| Ingredient | Percent by Weight of PU mixture |
| --- | --- |
| Polycaprolactone ester toluene-diisocyanate prepolymer | 69.49 |
| Polybutadiene diol | 12.33 |
| Trifunctional curative (Polyol TP30 ® ) | 2.45 |
| Graft polyacrylate Example 3 | 15.48 |
| Ferric chloride | .15 |
| Triisopropanolamine | .10 |
| Total | 100.00 |

Oxidative bake process: 10 hours at 120° C.

Example 8

| Ingredient | Percent by Weight of PU mixture |
|---|---|
| Polycaprolactone ester toluene-diisocyanate prepolymer | 67.78 |
| Polybutadiene diol | 12.33 |
| Trifunctional curative (Polyol TP30 ®) | 2.18 |
| Graft polyacrylate Example 4 | 17.45 |
| Ferric chloride | .15 |
| Triisopropanolamine | .11 |
| Total | 100.00 |
| Oxidative bake process: 10 hours at 120° C. | |

Urethane prepared using a 1.05 stoichiometric ratio of —OH to —NCO.

Example 9

Comparative

| Ingredient | Percent by Weight of PU mixture |
|---|---|
| Polycaprolactone ester toluene-diisocyanate prepolymer | 82.68 |
| Polybutadiene diol | 12.39 |
| Trifunctional curative (Polyol TP30 ®) | 4.66 |
| Ferric chloride | .17 |
| Triisopropanolamine | .10 |
| Total | 100.00 |
| Oxidative bake process: 10 hours at 100° C. | |

TABLE 2

Roll/Button Electrical and Physical Properties

| Example | $Rho_c$ (ohm-cm) | Tc (μm) | $Rho_b$ (ohm-cm)[1] | Hardness (Shore A)[2] | Compression Set[3] | $CHCl_3$ Extractable |
|---|---|---|---|---|---|---|
| 5 | $2.0 \times 10^{11}$ | 64 | $8.3 \times 10^7$ | 42 | 3.3% | 1.3% |
| 6 | $1.1 \times 10^{11}$ | 73 | $8.1 \times 10^7$ | 41 | 3.6% | 2.6% |
| 7 | $4.6 \times 10^{11}$ | 56 | $6.3 \times 10^7$ | 40 | 3.6% | 3.1% |
| 8 | $1.4 \times 10^{11}$ | 77 | $1.0 \times 10^8$ | 41 | 3.2% | 2.1% |
| 9 | $2.5 \times 10^{11}$ | 114 | $1.1 \times 10^8$ | 55 | <5% | 0.5% |

[1]$Rho_b$: bulk resistivity measured at 1 kHz
[2]Hardness test: ASTM D2240-86; Shore A; reported for button sample
[3]Compression Set test: ASTM D395-89; method B; exposed for 22 hours at 70° C.; reported for button sample The data in Table 2 illustrate that the addition of the graft polyacrylate curatives to the polyurethane elastomer formulations in Examples 5–8, affords softer elastomers relative to the comparative formulation depicted by Example 9, while retaining suitable compression set, a sufficiently low percent extractables, and desirable electrical properties. In addition, the desirable highly resistive surface layer is maintained. In summary, the inventive rolls retain all the advantages of those in the prior art, while conferring the additional advantage of being suitable for use in reduced-geometry electrophotographic applications. Print test results of the inventive rolls indicate that they have excellent print performance. In particular, the performance of the inventive rolls as developer rolls in electrophotographic printers is such that the deficiencies with respect to print variations and "white gapping," observed upon reducing the diameter of the roll from 20 mm to 15 mm, are essentially eliminated, and, wherein the inner layer has a diameter of about 8 mm.

The Examples and specific embodiments described herein are for illustrative purposes only and are not intended to be limiting of the invention defined by the following claims. Additional embodiments and examples within the scope of the claimed invention will be apparent to one of ordinary skill in the art.

What is claimed is:

1. A roll comprising an inner conductive layer and an outer layer disposed about the inner layer, the outer layer comprising a polyurethane elastomer, wherein the elastomer is formed from a polyurethane mixture comprising (ai) a urethane prepolymer or (aii) a polydiene diol or polydiene prepolymer with toluene diisocyanate, and (b) at least one graft polyacrylate curative, wherein the outer layer has a thickness of about 3.5 mm and the roll exhibits a low compression set of less than about 5% as measured according to ASTM D395, Method B.

2. The roll as recited in claim 1 wherein the elastomer is formed from a polyurethane mixture further comprising: trifunctional polyol curative; conductive modifier; hydrolytic stabilizer; and, optionally, linear polymer curative, wherein the roll has an oxidized outer surface.

3. The roll as recited in claim 2 wherein the roll is a developer roll.

4. The roll as recited in claim 2 wherein the urethane prepolymer comprises polycaprolactone ester toluene diisocyanate prepolymer.

5. The roll as recited in claim 2 wherein the polydiene diol comprises polybutadiene diol.

6. The roll as recited in claim 2 wherein the conductive modifier comprises a conductive metal salt selected from the group consisting of ferric chloride, ferrous chloride, calcium chloride and cobalt hexafluoroacetylacetonate.

7. The roll as recited in claim 2 wherein the conductive modifier comprises ferric chloride.

8. The roll as recited in claim 2 wherein the hydrolytic stabilizer comprises triisopropanolamine.

9. The roll as recited in claim 2 wherein the polyurethane mixture comprises from about 1% to about 50% by weight of the at least one graft polyacrylate curative.

10. The roll as recited in claim 2 wherein the polyurethane mixture comprises from about 5% to about 35% by weight of the at least one graft polyacrylate curative.

11. The roll as recited in claim 2 wherein the polyurethane mixture comprises from about 8% to about 20% by weight of the at least one graft polyacrylate curative.

12. A roll comprising an inner conductive layer and an outer layer disposed about the inner layer, the outer layer comprising a polyurethane elastomer, wherein the elastomer is formed from a polyurethane mixture comprising (ai) a urethane prepolymer or (aii) a polydiene diol or polydiene prepolymer with toluene diisocyanate, and (b) at least one graft polyacrylate curative; and wherein the elastomer is formed from a polyurethane mixture further comprising: trifunctional polyol curative; conductive modifier; hydrolytic stabilizer; and, optionally, linear polymer curative, wherein the roll has an oxidized outer surface; and wherein the at least one graft polyacrylate curative has a number average molecular weight of greater than about 1000 and comprises at least one polyacrylate side chain grafted to a main chain, and wherein the main chain has a number average molecular weight of less than about 200 and exhibits diol functionality.

13. The developer roll as recited in claim 3 wherein the outer layer has a diameter of about 15 mm, and the inner layer has a diameter of about 8 mm.

14. The developer roll as recited in claim 3 exhibiting a Shore A hardness of less than or equal to about 48 as measured according to ASTM D2240-86.

15. A process of manufacturing an elastomeric roll as recited in claim 1, the process comprising including at least one graft polyacrylate curative in a polyurethane mixture, and subjecting the polyurethane mixture to conditions sufficient to effect curing.

16. A process of manufacturing a roll as recited in claim 1, comprising:
   a) forming a polyurethane mixture comprising at least one graft polyacrylate curative;
   b) casting the polyurethane mixture into a mold;
   c) subjecting the mixture to curing conditions sufficient to demold a resulting roll;
   d) demolding the roll and, optionally, post-curing the demolded roll;
   e) grinding the roll to desired dimensions; and
   f) baking the roll under conditions sufficient to oxidize an outer surface of the roll.

17. A process of manufacturing a roll as recited in claim 1, comprising:
   a) forming a polyurethane mixture comprising urethane prepolymer; polydiene diol or prepolymer of polydiene diol with toluene diisocyanate; trifunctional polyol curative; at least one graft polyacrylate curative; conductive modifier; hydrolytic stabilizer; and, optionally, block polymer curative;
   b) casting the polyurethane mixture into a mold;
   c) subjecting the mixture to curing conditions sufficient to demold a resulting roll;
   d) demolding the roll and, optionally, post-curing the demolded roll;
   e) grinding the roll to desired dimensions; and
   f) baking the roll under conditions sufficient to oxidize an outer surface of the roll.

18. The process as recited in claim 17 wherein the mold is shafted.

19. The process as recited in claim 17 wherein the graft polyacrylate curative has a number average molecular weight of greater than about 1000 and comprises at least one polyacrylate side chain grafted to a main chain, and wherein the main chain has a number average molecular weight of less than about 200 and exhibits diol functionality.

20. The process as recited in claim 17 wherein the urethane prepolymer comprises polycaprolactone ester toluene diisocyanate prepolymer.

21. The process as recited in claim 17 wherein the polydiene diol comprises polybutadiene diol.

22. The process as recited in claim 17 wherein the conductive modifier comprises a conductive metal salt selected from the group consisting of ferric chloride, ferrous chloride, calcium chloride and cobalt hexafluoroacetylacetonate.

23. The process as recited in claim 17 wherein the conductive modifier comprises ferric chloride.

24. The process as recited in claim 17 wherein the hydrolytic stabilizer comprises triisopropanolamine.

25. The process as recited in claim 17 wherein the polyurethane mixture further comprises antioxidant.

26. The process as recited in claim 17 wherein the polyurethane mixture comprises from about 1% to about 50% by weight of the at least one graft polyacrylate curative.

27. The process as recited in claim 26 wherein the polyurethane mixture comprises from about 5% to about 35% by weight of the at least one graft polyacrylate curative.

28. The process as recited in claim 26 wherein the polyurethane mixture comprises from about 8% to about 20% by weight of the at least one graft polyacrylate curative.

* * * * *